Sept. 29, 1936.   F. T. IRGENS   2,055,724
POWER LAWN MOWER
Filed March 22, 1934   3 Sheets-Sheet 2

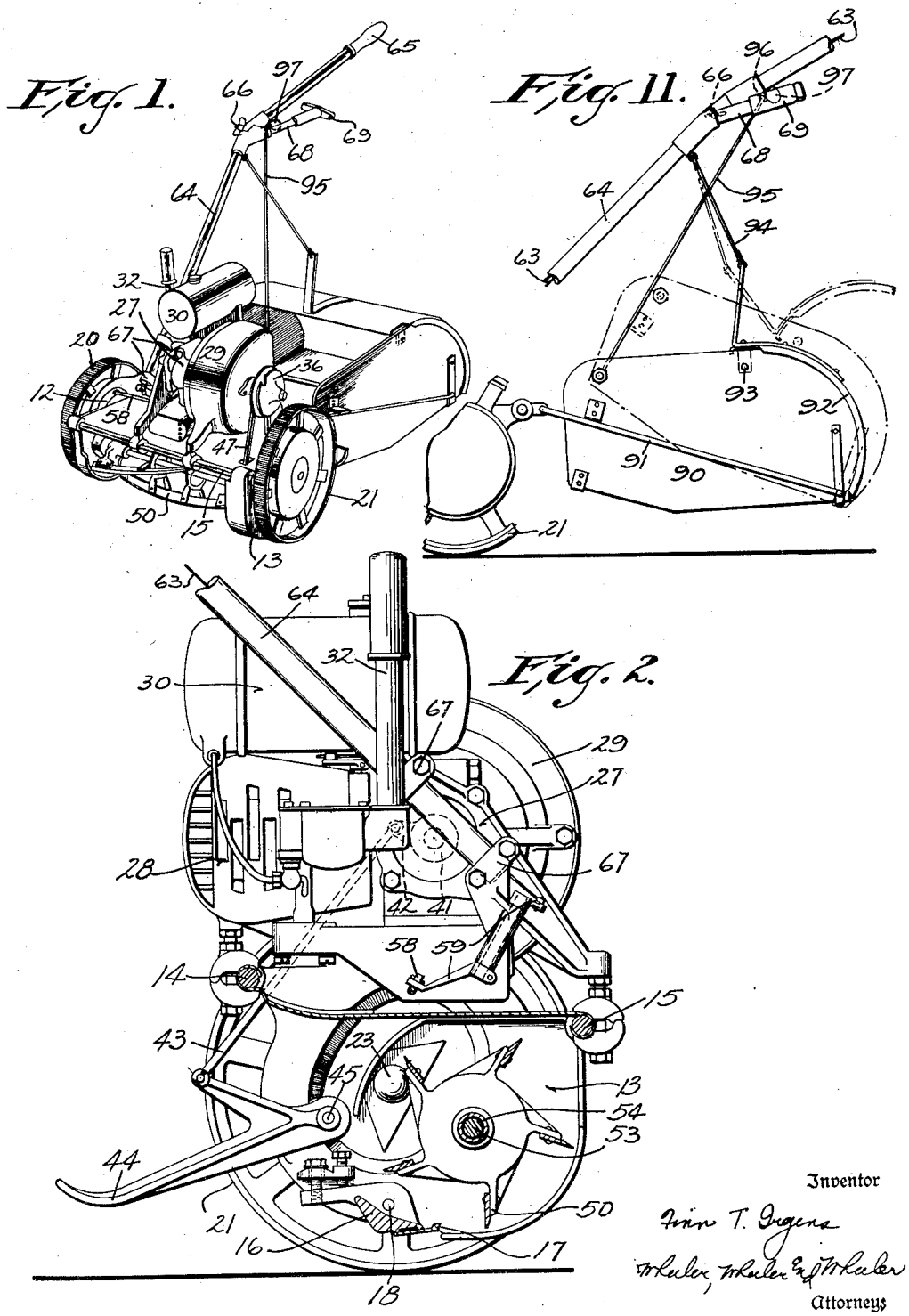

Inventor
Finn T. Irgens
By Wheeler, Wheeler & Wheeler
Attorneys

Sept. 29, 1936. F. T. IRGENS 2,055,724
POWER LAWN MOWER
Filed March 22, 1934 3 Sheets-Sheet 3
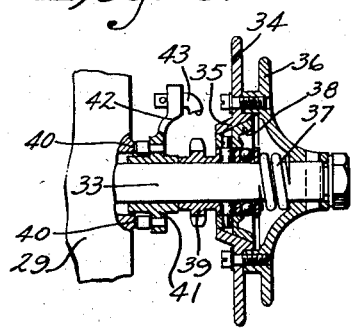
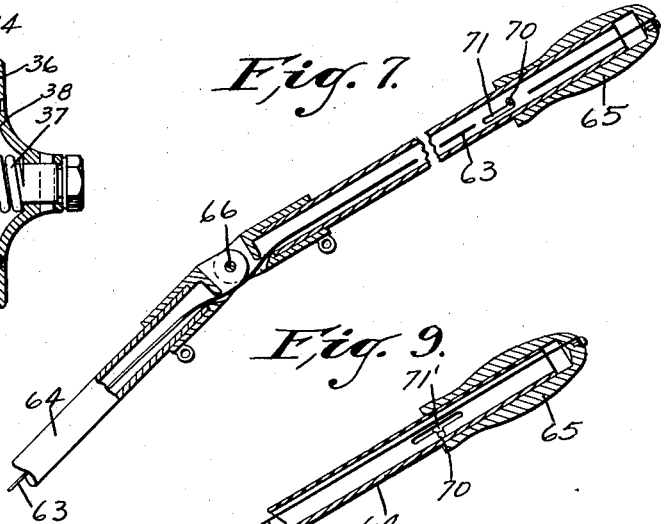
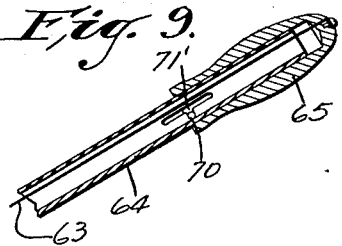
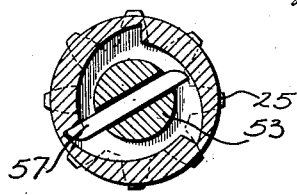
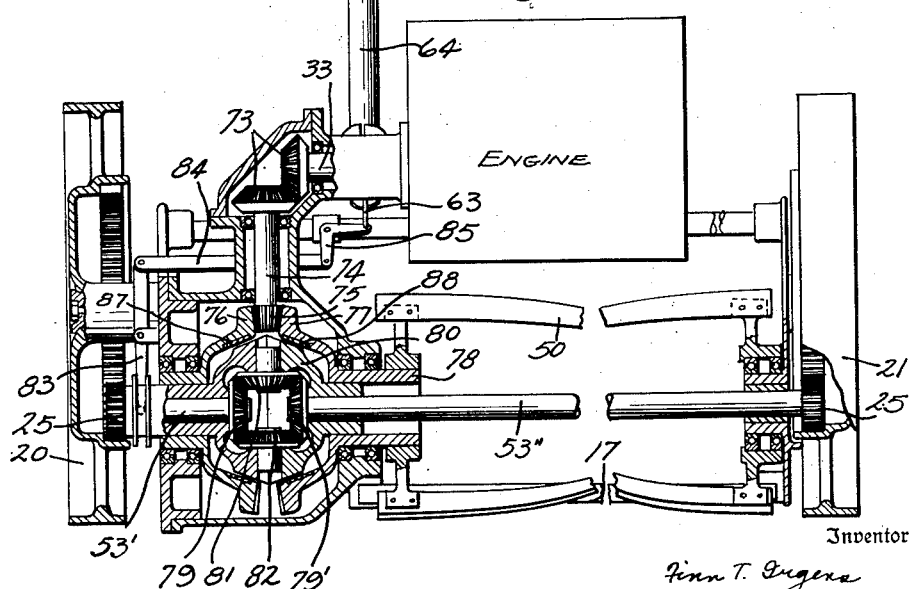
Inventor
Finn T. Irgens
By
Wheler, Wheler and Wheler
Attorneys Patented Sept. 29, 1936

2,055,724

UNITED STATES PATENT OFFICE 2,055,724

POWER LAWN MOWER

Finn T. Irgens, Wauwatosa, Wis., assignor to Outboard Motors Corporation, Milwaukee, Wis., a corporation of Michigan Application March 22, 1934, Serial No. 716,815

3 Claims. (Cl. 56—26)

This invention relates to improvements in power lawn mowers.

While there are many objects of the present invention having to do with simple, compact and inexpensive organization of the structure, the principal objects are as follows:

1. The simplification of the operation and control of a power driven lawn mower by an arrangement which makes the lawn mower automatically and completely responsive to the movements of the operator. The device is provided with a grip which rests lightly in the operator's hand and is movable in a forward and rearward direction with respect to the end of the lawn mower handle. This grip is so connected with a clutch or clutches that any movement of the grip with respect to the handle will operate the clutch or clutches tending to restore the original relation of these parts. Thus, if the operator advances, the lawn mower advances; and if the operator stops, the lawn mower will stop. If the operator moves to the rear, the lawn mower may likewise be made to move to the rear. There is also a special control which disengages the engine from all mechanism of the lawn mower if the operator releases his control of the handle.

2. The provision of a lawn mower which will operate to produce a uniform cut regardless of irregularities in the ground surface and regardless of the position in which the mower is held by the operator.

3. It is important to the invention that the present mower is balanced upon driving wheels, thereby dispensing with the usual roller. In order that the weight on the handle may not be excessive, the engine and driving parts are also substantially balanced above the axis of the wheels. The entire device is thus free to tilt about the axis of its wheels and if the shear blade were located either materially ahead or materially behind the axis it would be raised or lowered from the ground according to the position in which the mower might be operated.

For the purposes of the present invention the line of cut is located substantially directly below the axis of the wheels so that, irrespective of position, it will maintain a very definite setting with reference to the ground traversed. Since there is no roller and no support for the device other than the driving wheels, it will be obvious that the mower will conform readily to every change in ground level.

The more specific objects of the invention will appear from the following disclosure.

In the drawings:

Figure 1 is a view in perspective of a power lawn mower embodying the present invention.

Figure 2 is a view of the mower on an enlarged scale in section taken on the line 2—2 of Figure 3.

Figure 6 is a fragmentary detail in section showing the engine clutch.

Figure 7 is a view partially in side elevation and partially in axial section, showing the control handle and grip.

Figure 8 is a view similar to Figure 3, showing a modified embodiment of the invention.

Figure 9 is a fragmentary detail in section of the handle and control grip used with the Figure 8 embodiment.

Figure 10 is a fragmentary detail of the driving dog and overrunning clutch assembly shown in section.

Figure 11 is a view on a reduced scale showing in side elevation and partially in section the application of the grass catcher to the device.

Like parts are identified by the same reference characters throughout the several views.

Figure 3:
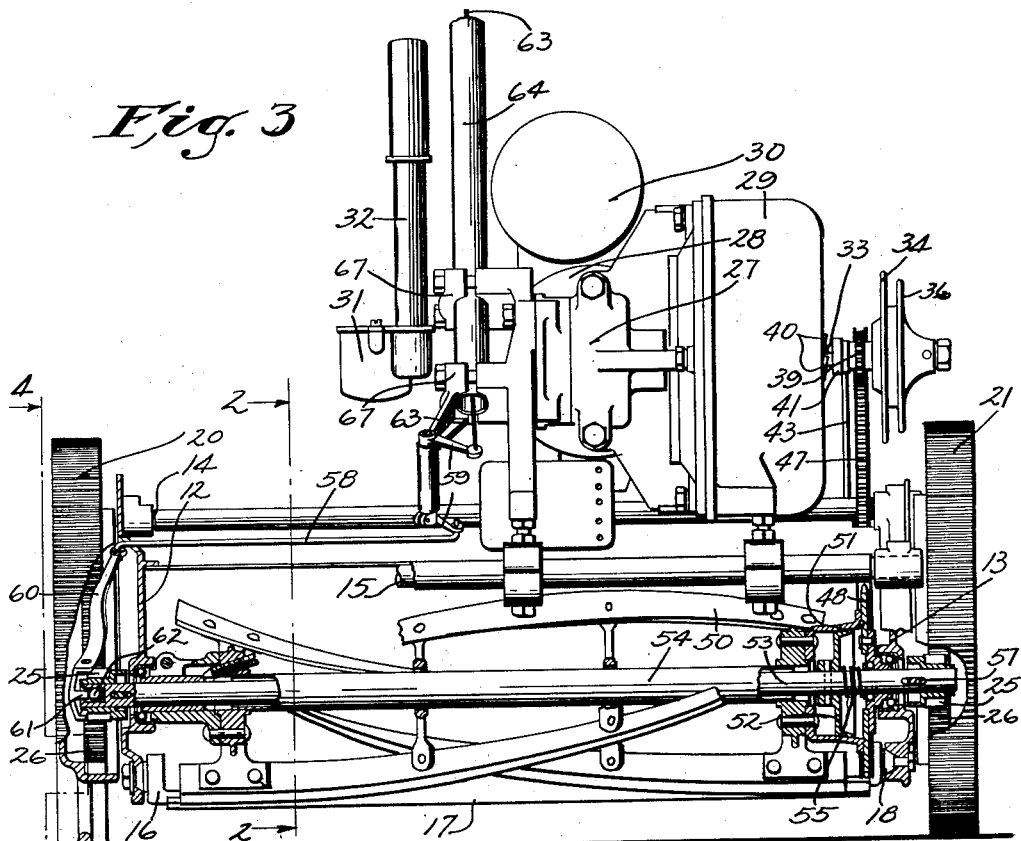
Figure 3 is a front elevation of the device, with portions of the mechanism broken away through an axial section to disclose details of construction.
Figure 4:
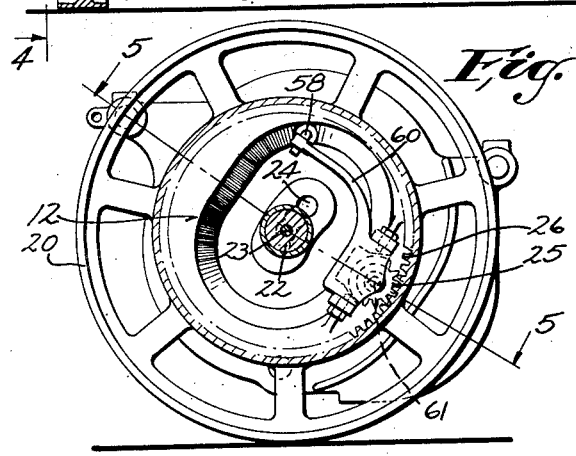
Figure 4 is a detail taken in section on the line 4—4 of Figure 3.
Figure 5:
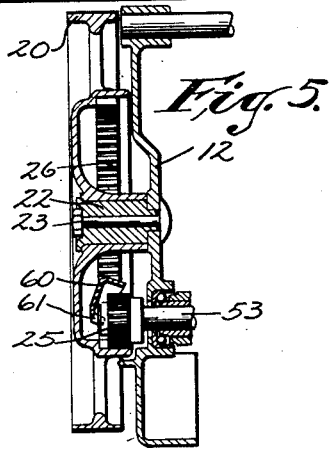
Figure 5 is a view taken in section in the plane indicated at 5—5 in Figure 4.

The frame of the machine comprises the usual heads 12 and 13 connected by frame bars 14 and 15 and by the carrier 16 for the shear blade 17, said carrier being fulcrumed at 18 to the respective heads and adjusted by the conventional set screw arrangement.

The wheels 20 and 21 for the support of the frame are adjustably connected to the respective heads 12 and 13 by means of axle skeins 22 adjustably fixed by bolts 23 in slots 24 which are arcuately concentric with the point of mesh of driving pinions 25 through the internal gears 26 of the wheels. The driving pinions and their connections will be described hereinafter.

Mounted on the frame bars 14 and 15 is an engine which may be of conventional two cycle design. The engine illustrated has a crank case 27 and cylinder 28 provided with air cooling flanges as shown in Fig. 2, a magneto, a fly wheel housing 29, a fuel tank 30, a carburetor 31 having air inlet pipe 32, and a crank shaft 33.

Upon the projecting end of crank shaft 33 is a combined rope starter disk and clutch shown in Figs. 1, 3 and 6. The starting pulley is made up of a disk 34 comprising a conical clutch face 35 connected by bolts to the notched disk 36 which is fastened to the end of the drive shaft 33. The notched disk 36 houses a clutch spring 37 engaged to a suitable thrust bearing with the driving clutch member 38 which is fastened by radial pins to the hub of a sprocket pulley 39. The end face of the fly wheel and magneto housing 29 is provided at 40 with cam teeth peripherally disposed about shaft 33. A collar 41 bearing freely upon shaft 33 has axially projecting pins shown clearly in Fig. 6 comprising cam followers engageable with the teeth to move the collar axially and thereby to disengage the clutch when the collar is rotated by means of arm 42 and link 43. This link is connected with the foot 44 pivoted at 45 to the frame and projecting rearwardly to engage the ground whenever the operator releases the control handle hereinafter to be described. As the machine tends to oscillate, when so released, its weight will cause the foot 44 to pivot about the fulcrum 45, thereby disengaging the clutch and allowing the engine to continue in operation without operating any part of the apparatus.

The driven sprocket 39 of the clutch mechanism just described is connected by a chain 47 with a sprocket 48 directly connected with the reel 50 so that the reel will continue in operation at all times when the clutch on the engine shaft is engaged. The hub portion 51 of sprocket 48 comprises the outer member of another clutch by which the operation of the driving wheels 20 and 21 is controlled separately from the operation of the reel 50. The inner clutch member 52 is mounted upon a shaft 53 which extends axially through the tubular reel shaft 54. Shaft 53 is axially movable for the engagement and disengagement of clutch member 52 from clutch member 51, the engagement being effected under the bias of a clutch spring at 55.

At its ends shaft 53 carries the pinions 25, in the hubs of which are located the type of overrunning clutch so common in lawn mowers, the interior of the hub being toothed and the shaft having a dog 57 designed to engage the teeth in one direction of relative rotation and to reciprocate to pass the teeth in the other direction of relative rotation of the shaft and pinion. In the ordinary hand operated lawn mover, the wheels 20 and 21 drive the reel through such a clutch. In this device the functioning of the clutch is reversed and the reel serves to drive the wheels when the propelling clutch comprising parts 51 and 52 is engaged.

The axial manipulation of shaft 53 to control the functioning of the propelling clutch is subject to the regulation of a lever 60 housed within the supporting wheel 20 and having a terminal finger 61 engageable with a thrust ball 62 socketed in the end of the shaft 53, as shown in Fig. 3. This lever is connected through an aperture in the head 12 by means of link 58 to a bell crank 59 which in turn is connected to a Bowden wire 63 extending lengthwise through the tubular handle lever 64 which is rigidly fastened to the engine mounting bracket. This lever may, if desired, be jointed as shown in Fig. 7, and at its end it has a sliding handle grip 65 to which the control wire 63 is anchored. A wing nut bolt 66 clamps the joint rigidly in any given adjustment.

It will be noted that the lever 64 is not pivoted to the mower in accordance with standard practice, but is rigidly clamped thereto by means of bracket fittings 67 (Fig. 3). The forward location of the shear blade and reel, the total absence of any roller or caster wheels, the balance of the engine upon the frame, and the rigid connection of the lever with the mower,—these are all features which enable the mower to be balanced by the operator with one hand to make a uniform cut irrespective of ground contour, and to maintain its full load on the driving wheels under circumstances which would make it impossible for an ordinary mower to propel itself.

For special work such as may require the mower to be drawn back repeatedly to the operator by hand, an auxiliary lever 68 and grip 69 may be used, as shown in Fig. 1. In this construction each of the grips 65 and 69 is preferably connected by a Bowden wire with the bell crank 59, so that the manipulation of either grip will operate the clutch. The fact that branch handle 68 is shorter than handle 64 enables the operator to draw the machine toward himself without taking a step backward as he might otherwise be required to do.

It will be observed that the grip arrangement is so nearly automatic as to relieve the operator of all consciousness of control. While the grip may be locked to the lever by engaging pin 70 in the offset portion of slot 71 (Fig. 7), it is ordinarily freely movable on the lever responsive to the operator's position. If the operator advances, the pressure of his hand on grip 65 will move the grip forwardly along the lever, thereby causing wire 63 to operate the control lever 60 to engage clutch parts 51 and 52 to set the driving wheels in motion in a forward direction. If the operator stops or slows his speed, the frame will tend to progress more rapidly than the grip 65, thereby retracting the grip with respect to the lever and disengaging the clutch parts to relieve the wheels 20 and 21 of their traction while maintaining the reel in full speed operation. Thus, without any conscious effort on the part of the operator, the machine is made to accommodate itself to his rate of movement and, even without the governor with which the engine is provided, the mower would advance just as fast as the operator, and no faster.

Where a large amount of backward movement, as well as forward movement, is required, the device may be made to include a simple reverse and differential gear mechanism such as is illustrated in Fig. 8, in which the engine is shown diagrammatically. In this construction the mower is somewhat wider in proportion to the length of the reel. It is one of the advantages of the construction shown in Figs. 1, 2, and 3 that the reel is full width.

The engine drive shaft 33 may, in the Fig. 8 construction, transmit motion through bevel gearing 73 to pinion shaft 74 and pinion 75. With the pinion, mesh the two gears 76 and 77 for rotation in opposite directions. The reel 50 is mounted on the hub 78 of gear 77 to turn constantly in the proper direction with respect to the shear blade 17. The pinions 25 which drive the wheels 20 and 21 are mounted at the ends of live axles 53' and 53" respectively. At their adjacent ends these live axles carry gears 79 and 79' of a differential gear set held in assembly by the two parts of a spider 80 which carries the intermediate gears 81 and 82 of the differential. The arrangement is such that the spider 80 and live axles 53' and 53" are movable axially as a unit under the control of a shifting fork 83 connected by link 84 and bell crank 85 with the Bowden wire control member 63 which leads upwardly along handle lever 64 as previously described.

The spider 80 has two annular conically tapered clutch faces at its outer periphery, as clearly shown in Fig. 8, and these are engageable alternatively with the clutch linings 87 and 88 within the reversely driven gears 76 and 77. Where this construction is used the grip 65 is made to be movable in either direction from an intermediate position defined by the leg of a T-shaped slot 71' as shown at Fig. 9. When the pin 70 is centered in the main run or slot 71', the grip is freely moved under the control of the operator, so that the machine will not only advance when he advances and stop when he stops, but will reverse itself if he moves rearwardly.

In order to maintain the machine in continuous operation it is desirable to provide a grass catcher which may be dumped to deposit cut grass in windrows without stopping the mower. Such a device is shown in Figs. 1 and 11, wherein a grass catching hopper 90 is connected immediately behind the mower to receive grass from the reel. A link mechanism 91 connects the rear corner of the hopper pivotally with the mower. The rear of the hopper is releasably closed by a gate 92 pivoted to the hopper at 93 and supported by a wire or other tension member 94 flexibly from the handle lever.

A second wire or tension member 95 leads from the forward top corner of the hopper to an eye 96 on the handle, where a knob 97 is provided for the convenient grasp of the operator. When this knob is pulled a compound pivotal movement results whereby the hopper is caused to tilt rearwardly upon a primary fulcrum provided by the lower end of the link mechanism 91. This moves the fulcrum 93 of the rear door 92 in an upward and rearward direction whereby the tension of wire 94 causes the door to open and to discharge the contents of the hopper. When the knob 97 is released, gravity will restore the parts to the position illustrated.

It is desired to emphasize certain features of the invention as follows.

The full weight of the mower is on the driving wheels 20 and 21 which are thereby given a grip upon the earth's surface to propel the mower without slipping or tearing of sod. Due to the absence of any roller this condition obtains regardless of the angle at which the operator holds the handle. The device is so balanced moreover, that in the normal handle position the operator's hand will be substantially relieved of all pressure except a small portion of the weight of the handle itself.

Due to the fact that the shear blade and reel cut upon a line which is almost directly below the axes of the wheels, the length of grass remaining following the cut will always be determined by the adjustment of the wheels themselves and will not be materially affected by any change in position of the mower or the ground acted upon. The length of cut of grass in the hollow at the bottom of a terrace will be the same as the length of cut of the grass on the convex top of the terrace.

It has already been pointed out that the connection of the grip with the clutch controlling the driving wheels is such that the mower will start or stop with the operator quite independently of any conscious effort on his part. Yet the reel will continue in operation so that on the backward pull of the mower, when the operator is working to a line, the grass will be severed the same as if the mower were moving forwardly. If, however, the operator releases the handle its weight will cause the mower to tilt in a rearward direction to rest upon the foot 44, thereby immediately stopping the operation of the reel. The clutch controlled by this foot and shown particularly in Fig. 6, is preferably rather loosely set so that it serves as a slip clutch and permits the reel to stop if a stone or stick becomes wedged between the reel and the shear blade. The operator, however, cannot release such a stone without also releasing the handle grip and when he does this, the gravity induced movement of the machine itself on to foot 44 fully disengages the clutch in question so that the operator is safeguarded from accidental injury in the removal of the obstruction.

The control mechanism herein disclosed is described generically because it is applicable, without change, to many other forms of self-propelling tools including such items as power cultivators, and even vacuum cleaners. The description of the invention with reference to a lawn mower is, in this respect, therefore to be regarded as purely illustrative.

I claim:

1. A lawn mower comprising the combination with a tubular frame and a shear bar carried thereby, of a reel operatively mounted for rotation on said frame and comprising a tubular shaft and a driving hub member connected therewith, a propeller shaft extending through said tubular shaft and provided with means for driving the wheels of said frame, said propeller shaft having a complementary clutch member, means for controlling the engagement and disengagement of said clutch members for the transmission of motion from the reel to the wheels, a prime mover mounted on said frame and providing clutch controlled means for primarily actuating said reel, a handle for said frame, and means for actuating said last mentioned clutch to its disengaged position upon the release of said handle.

2. In a lawn mower, the combination with a suitable frame and mowing means mounted in fixed position thereon, of a pair of wheels, motion transmitting connections between said wheels and mowing means, and means for adjusting each of said wheels individually with respect to said frame and about said connections.

3. In a lawn mower, the combination with propelling wheels provided with internal gear teeth and with hubs, of a drive shaft carrying pinions meshing with the teeth of said wheels, a frame, and skeins for said hubs adjustable on said frame in an arc concentric with the point of mesh between said pinions and gear teeth, said frame carrying a cutter adjustable to and from the ground by the adjustment of the individual wheels aforesaid.

FINN T. IRGENS.